Aug. 15, 1944.    F. KLEIN    2,355,736
FAUCET
Filed June 29, 1942    3 Sheets-Sheet 2

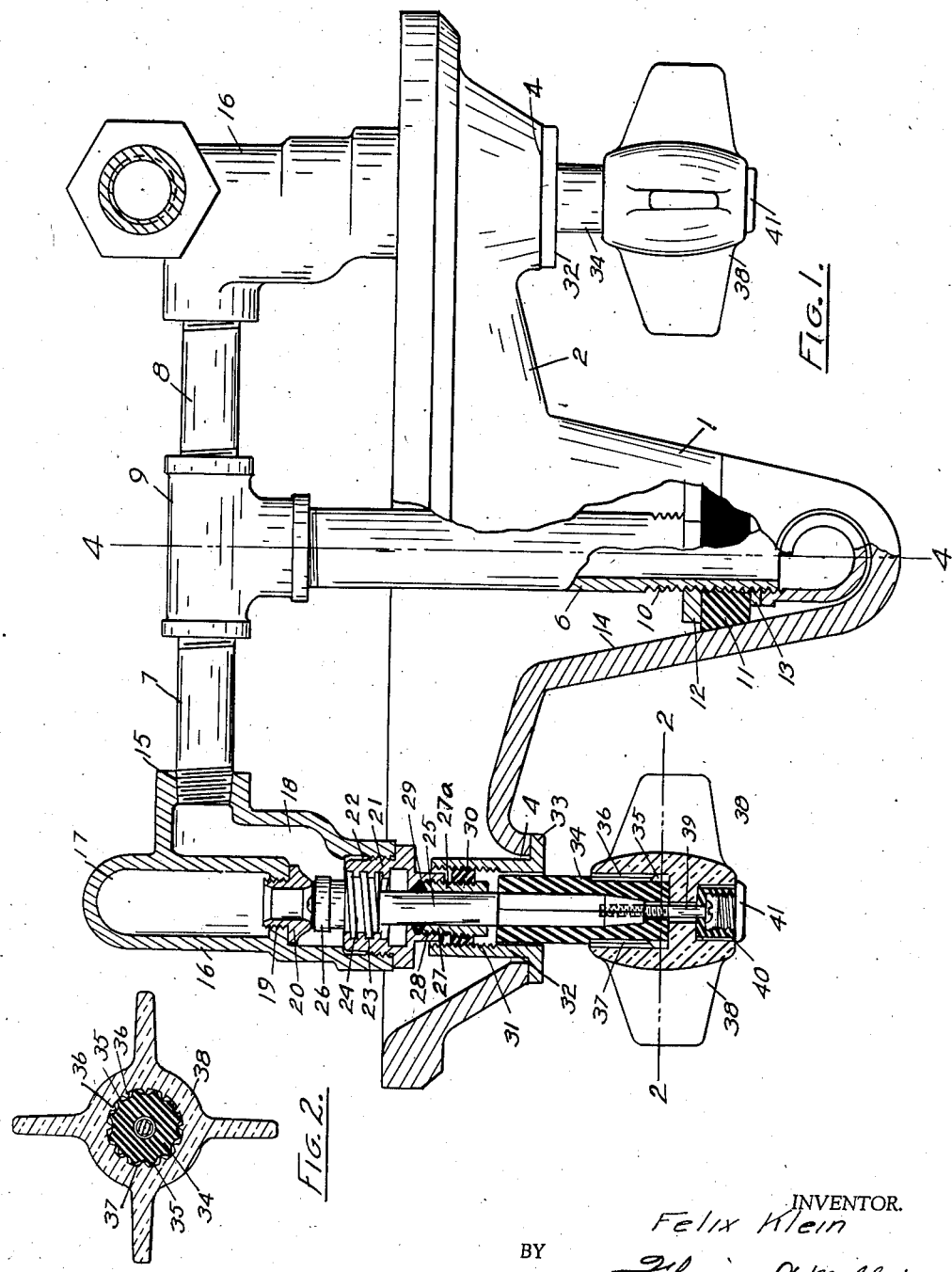

INVENTOR.
Felix Klein
BY
Florian G. Miller
ATTORNEY

Aug. 15, 1944.   F. KLEIN   2,355,736
FAUCET
Filed June 29, 1942   3 Sheets-Sheet 3

INVENTOR.
Felix Klein
BY
Florian J. Miller
ATTORNEY

Patented Aug. 15, 1944

2,355,736

UNITED STATES PATENT OFFICE 2,355,736

FAUCET

Felix Klein, Erie, Pa., assignor to Hays Manufacturing Company, Erie, Pa., a corporation of Pennsylvania Application June 29, 1942, Serial No. 449,002

3 Claims. (Cl. 137—111)

This invention relates generally to built-in plumbing fixtures and more particularly to built-in single and double faucets.

All devices of this character made according to the teachings of the prior art, and with which I am familiar, have been of such construction that they required the use of considerable amounts of brass and other similar non-ferrous materials which are now critical materials. There was much waste in the manufacture of these prior devices. None of these prior devices have been so constructed that plastics, glass, and other non-critical material could be used with a minimum of waste. These prior faucets have been very costly. It has heretofore been necessary to use screws, bolts and like fastening members to secure built-in faucets and covers therefor. It has been necessary to remove these screws in order to effect repairs in prior built-in faucets.

It is accordingly an object of my invention to overcome the above and other defects in faucets, and it is more particularly an object of my invention to provide a faucet which is simple in construction, efficient in operation, endurable, economical in cost, and economical in manufacture.

Another object of my invention is to provide a faucet which can be manufactured almost entirely from non-ferrous materials.

Another object of my invention is to provide a one-piece spout and body portion for a double faucet.

Another object of my invention is to provide a built-in faucet body which requires a minimum amount of material.

Another object of my invention is to provide a novel valve stem, stuffing-box, and valve set in a built-in faucet.

Another object of my invention is to provide a cast valve stem for a built-in faucet.

Another object of my invention is to provide valve stems and a spout in the same horizontal plane.

Another object of my invention is to provide a novel, adjustable, supporting means for the spout cover portion of a double faucet.

Another object of my invention is to provide insulating means between the pipes and cover of a built-in faucet.

Another object of my invention is to provide fastening means for a built-in faucet without using screws, bolts, and the like.

Other objects of my invention will become evident from the following detailed description, taken in conjunction with the accompanying drawings, in which:

Fig. 1 is a top plan view of my novel invention with a part broken away on the line 1—1 of Fig. 4 for better illustration.

Fig. 2 is a view taken on the line 2—2 of Fig. 1.

Figure 3:
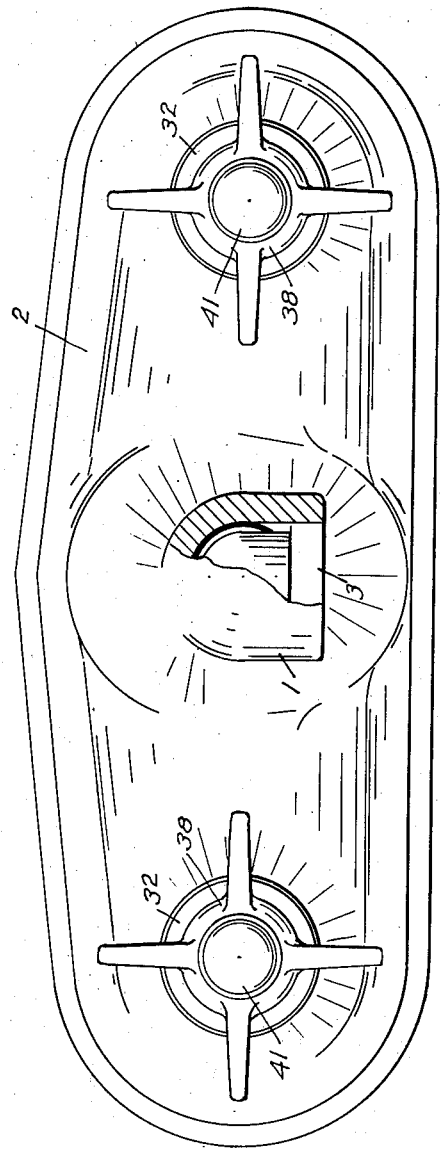
Fig. 3 is a front elevational view of my novel invention.
Figure 4:
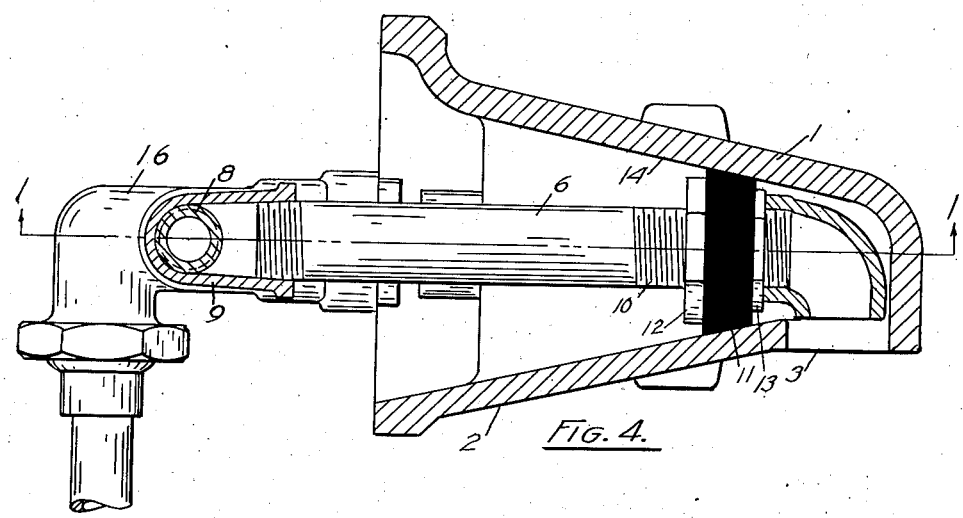
Fig. 4 is a view taken on the line 3—3 of Fig. 1.

Referring now to the drawings, Figs. 1, 2, 3 and 4 show a one-piece spout cover 1 and body portion 2 preferably made of glass, plastic, or other suitable non-critical material. The body portion 2 has an outlet opening 3 and spaced laterally-extending openings 4. A common pipe 6 is connected to hot and cold pipes 7 and 8 by a T-member 9. The outer threaded end 10 of the pipe 6 has threadably-engaged thereto, a conical-shaped washer 11 with lock washers 12 and 13 disposed on opposite sides thereof. The inner side 14 of the spout cover 1 is tapered at an angle corresponding to the outer tapered surface of the conical washer 11. The conical-shaped washer 11 engages the inner side 14 of spout cover 1 and provides support for it plus insulation against heat transfer from the pipe 6 to the spout cover 1. The conical washer 11 is movable on the pipe 6 to permit adjustment thereof so that the spout cover 1 and body portion 2 may be moved inwardly or outwardly in the installation thereof.

The hot and cold water pipes 7 and 8 are connected to the outlet openings 15 in novel cast members 16 having an inlet chamber 17 and an outlet chamber 18, interconnected by an opening 19. The inlet chamber 17 is a pressure chamber. A removable valve seat 20 is disposed in the opening 19. It will be evident upon inspection that the raised seat or prolonged stem in prior faucets has been eliminated, thereby saving a considerable amount of material and materially shortening the body of the faucet. In conventional faucet bodies, the non-pressure area completely surrounded the raised valve and the seating portion of the valve stem. In my novel invention, the non-pressure area has been extended downwardly adjacent to and as an integral part of the pressure chamber 17, thereby greatly reducing the diameter of the faucet body and thereby also greatly reducing the amount of material required. A shortened bonnet member 21 is threaded into the upper open end 22 of the outlet chamber 18. An interior threaded portion 23 of the bonnet member 21 engages the threaded portion 24 of a cast valve stem 25 which extends through the bonnet member 21. The valve stem 25 has a seating surface 26 which engages the valve seat 20. A threaded bushing 27 surrounding the valve stem 25 has an outer threaded surface 27a which engages interior threads 28 in the bonnet member 21 and a sealing member 29 to provide a seal. An annular collar 30, preferably made of plastic or other insulating material, threaded inside and out, engages the bushing 26 and the inner threaded portion 31 of a supporting member 32 having a flanged portion 33 which is disposed in the apertures 4 in the body portion 2 of my novel invention. The supporting member 32 is adjustable to provide for any inward or outward movement of the spout cover 1 and body portion 2. A non-metallic sleeve 34 surrounds the outer end of the valve stem 25 and it is provided with radially-extending portions 35 which engage splines 36 in the recessed portion 37 of the handle 38. The handle 38 is secured to the valve stem 25 by means of a thread bolt 39 and a cup-shaped insert member 40. A threaded closing-cap member 41 made of plastic or like material is threadably engaged to the cup-shaped member 40. The horizontal axis of the valve stems 25 and handles 38 and the pipe 6 are all in the same plane to permit easy installation of the body portion without screws or other fastening means. The valve members may be repaired by merely removing the supporting members 32. By adjustment of the supporting members 32 and the washer 11, it will be evident that my faucet and cover therefor may be easily installed.

Figures 5, 6:
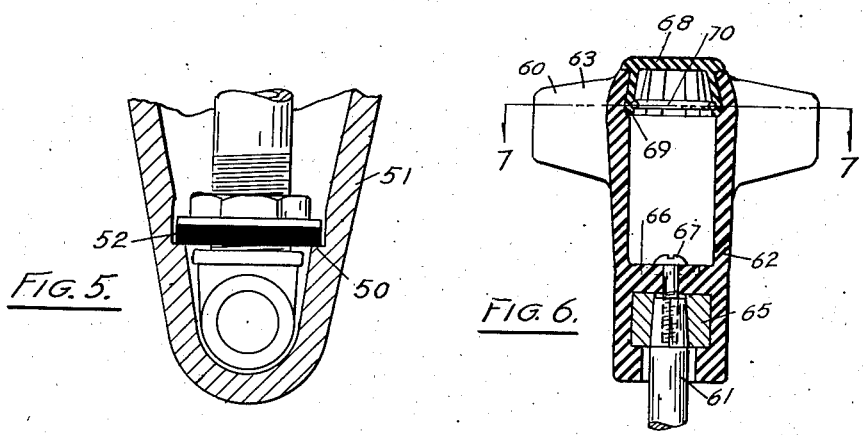
Fig. 5 is a fragmentary view showing a modified form of adjustable support for the spout cover of my novel invention.
Fig. 6 is a vertical sectional view through the handles and supporting means therefor of a modified form of my novel invention.

Fig. 5 is a modified form of spout cover supporting member wherein inner shoulders 50 formed on the inner side of the spout cover 51 are engaged by a washer 52 to support the spout cover 51. The washer 52 functions as an insulator the same as the conical washer in Fig. 1.

Figure 7:
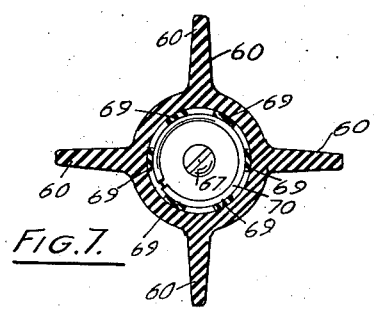
Fig. 7 is a view taken on the line 7—7 of Fig. 6.

Figs. 6 and 7 show a novel handle 60 and supporting means therefor. By use of this method of handle support, the valve stem 61 is materially shortened, thereby reducing the amount of critical material required. A plastic supporting sleeve 62 has radially-extending handle members 63 formed integral therewith. A small cup-shaped metal insert 65 engages the end of the valve stem 61 to prevent undue wear. A cross-member 66 has a screw bolt 67 extending therethrough to fixedly secure the supporting member 62 to the valve stem 61. A plastic, closing-cap member 68, having depending fingers 69, engages an inner spring ring member 70 disposed in the inner sides of the depending fingers 69.

It will be seen from the foregoing description that I have provided a mixing faucet and individual faucet construction which practically eliminates waste of material, reduces the amount of material required for manufacture, greatly reduces the cost of the faucet, and permits the use of non-critical material with minimum use of critical material, is easy to install, and easy to repair.

Various changes may be made in the specific embodiment of the present invention without departing from the spirit thereof or from the scope of the appended claims.

What I claim is:

1. In a faucet, in combination, a one-piece spout and body having oppositely disposed, laterally extending apertures, each aperture having disposed therein a flanged supporting member, a valve stem having a seating surface, a bushing surrounding said valve stem, a non-metallic collar threadably engaged to said bushing and to said flanged supporting member, and a sealing member between said valve stem and said bushing.

2. In a double mixing faucet, in combination, a one piece spout and body having oppositely disposed laterally extending apertures, each of said apertures having disposed therein an adjustable flanged supporting member, a valve stem having a seating surface, a bushing surrounding said valve stem, a non-metallic collar threadably engaged to said bushing and to said flanged supporting member, and a sealing member between said valve stem and said bushing; and independent adjustable supporting means for said spout cover.

3. In a double mixing faucet, in combination, a common mixing pipe, hot and cold water pipes connected to said common pipe, a one piece cover for said pipes having spaced lateral apertures, a valve connected to each of said water pipes, each of said valves having a valve stem in the same horizontal plane and parallel to said common pipe and extending through one of said apertures, a bushing surrounding said valve stem, a flanged supporting member, a non-metallic collar threadably engaged to said bushing and said flanged supporting member, and a sealing member between said valve stem and said bushing; said flanged supporting members engaging said cover, one in each of said apertures and adjustable supporting means on said common pipe for said cover.

FELIX KLEIN.